Dec. 6, 1955   J. R. MADEIRA   2,725,976
TENSIONING DEVICE FOR BELT CONVEYORS
Filed July 9, 1952   4 Sheets-Sheet 1

INVENTOR
John R. Madeira
BY Murray J. Gleeson
ATTORNEY

Dec. 6, 1955        J. R. MADEIRA        2,725,976
TENSIONING DEVICE FOR BELT CONVEYORS Filed July 9, 1952        4 Sheets-Sheet 3

INVENTOR
John R. Madeira
BY
Murray A. Gleeson
ATTORNEY

Dec. 6, 1955   J. R. MADEIRA   2,725,976
TENSIONING DEVICE FOR BELT CONVEYORS
Filed July 9, 1952   4 Sheets-Sheet 4

INVENTOR.
John R. Madeira
BY
Murray G. Gleeson
ATTORNEY

United States Patent Office 2,725,976
Patented Dec. 6, 1955

2,725,976

TENSIONING DEVICE FOR BELT CONVEYORS

John R. Madeira, Chicago, Ill., assignor to Goodman Manufacturing Company, Chicago, Ill., a corporation of Illinois Application July 9, 1952, Serial No. 297,870

21 Claims. (Cl. 198—208)

This invention relates generally to belt conveyors and particularly to improvements in devices for maintaining proper tension and the release of tension on the belt of a belt conveyor.

This application is a continuation-in-part of my application Serial No. 746,720, filed May 8, 1947, and now abandoned, for Devices for Maintaining Tension on the Slack Side of the Belt of a Belt Conveyor, and my application Serial No. 109,541, filed August 10, 1949, and now abandoned, for Belt Conveyors.

One of the principal objects of this invention is to provide a simple, novel and efficient apparatus for maintaining a predetermined tension on the slack side of the belt of a sectional belt conveyor.

Another object is to afford a take-up for the tension of a conveyor belt and to provide for the controlled release of such tension when it is desired completely to release such tension for any reason.

Another object is to provide a motor take-up for the tension idler roller of a belt conveyor which will operate to take up the tension as determined by a limit switch cooperating with a switch control spring, and which will also operate under power to release the tension as determined by a switch under the control of the operator of such belt conveyor.

Yet another object comprehends the provision of an electric motor operated winch which is energized to rotate in one direction to move a tension idler roller in a direction for take-up, and which is energized to rotate in the opposite direction to release a brake associated with the winch and controllably release the tension idler roller.

Other objects and important features of the invention will be apparent from a study of the following description taken together with the drawings which show some preferred embodiments thereof, and what are now considered to be the best modes of applying the principles thereof. While the invention is shown and described in terms of such embodiments it may assume in practice, its scope is not intended to be limited in terms of the embodiments shown nor otherwise than by the scope and breadth of the appended claims.

In carrying out my invention I provide a tension idler engaging a bight of the lower run of the belt and mount this tension idler on a movable carriage. I also provide a motor and winch with a flexible cable wrapped around the winch and connect the cable to the carriage to move the carriage in a direction to take up tension on the belt and operatively connect the cable to a control spring, loaded in accordance with the desired tension of the belt. Thus, as the cable moves the tension idler in a direction to place tension on the slack side of the belt, the spring will yield and operate a switch controlling the drive motor and cause same to stop. If the tension is relieved, as by stretching of the belt, the spring will extend and start the drive motor again to take up tension on the belt.

In another form of the invention, the tension idler roller moves on a carriage connected by a cable of a motor operated winch which is controlled by a limit switch operable by the change in length of a control spring. In such form the winch is also operable to release tension in the belt in a controlled manner so that the release of stored-up energy in the tensioned belt will not disrupt the tensioning roller and the positioning of the belt on the idler and driving rollers.

The belt conveyor illustrated in Figures 1 to 6 of the drawings may be of a well known sectional type including a framework consisting of a plurality of transverse supporting standards (not shown) detachably connected together by suitable spacing members (not shown). Said spacing members and standards have belt supporting idlers mounted thereon and form a means for supporting the upper and lower runs of a conveyor belt 10 in a manner somewhat similar to that shown and described in Patent No. 2,373,839, which issued to me on April 17, 1945, and are not herein shown or described since they form no part of my present invention. Said spacing members and standards may be connected adjacent the discharge end of the conveyor to an elevating frame 11 arranged to incline the belt upwardly to a discharge position.

The elevating frame 11 is shown as being transversely pivoted to a drive end frame 12 having an overhanging discharge end (not shown) with an idler roller (not shown) at its rear end, about which the belt reverses its direction of travel and returns to the inby end of the conveyor. The lower run of the belt extends from said discharge end of said frame towards the inby end of the conveyor, over and around a drive roller 15 and rearwardly therefrom and over and around a drive roller 16 (see Figure 1). From said drive roller the lower run of said belt travels forwardly towards the inby end of the conveyor along the lower portion of the frame 12, around and over a fixed idler 17 disposed adjacent the inby or forward end of the elevating frame 11. From thence, the lower run of the belt 10 extends rearwardly and is looped around a movable tension idler 19 to extend forwardly therefrom along said elevating frame and over an idler 20 adjacent the forward end thereof and to the inby end of the conveyor, while supported on the usual idlers.

Figure 2:
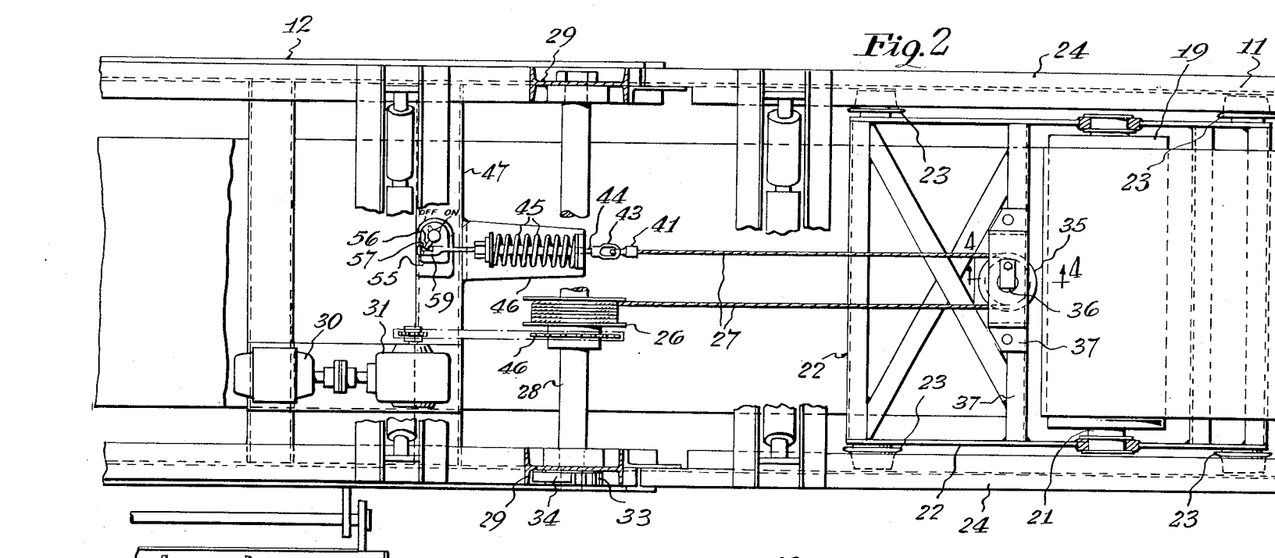
Figure 2 is an enlarged fragmentary plan view, with certain parts of the conveyor broken away in order to show certain details of the belt take-up and the carriage supporting the tension idler.
Figure 3:
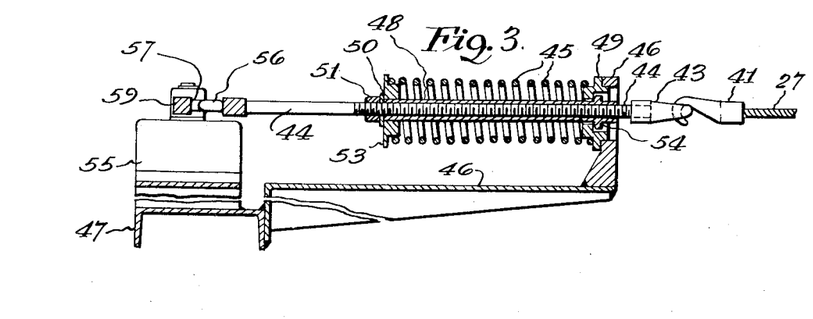
Figure 3 is a fragmentary longitudinal sectional view taken through the yieldable member which controls operation of the take-up.
Figure 4:
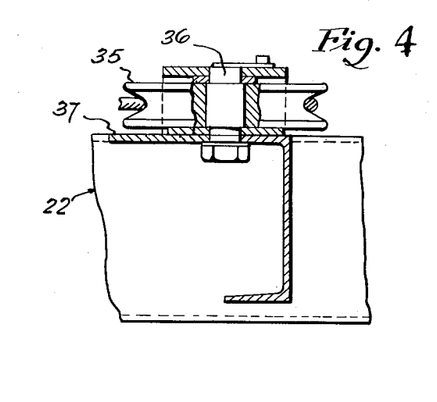
Figure 4 is an enlarged fragmentary longitudinal sectional view taken substantially along line 4—4 of Figure 2.
Figures 5, 6:
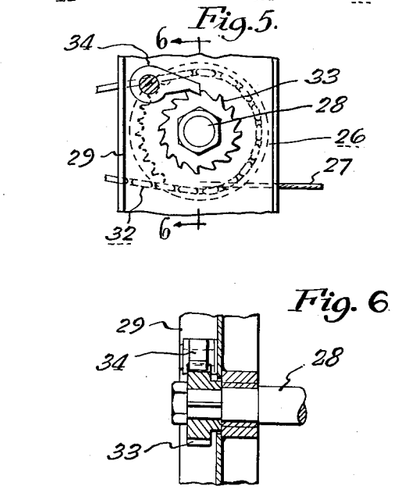
Figure 5 is an enlarged detail end view showing certain details of the pawl and ratchet device for holding tension on the belt.
Figure 6 is a fragmentary sectional view taken substantially along line 6—6 of Figure 5.

The tension roller 19 is mounted on a transverse shaft 21 which is journaled on a movable frame or carriage 22 (see Figure 2). The carriage 22 is shown as being a rectangular frame having track wheels 23, 23 mounted at its opposite sides and adjacent its opposite ends. The track wheels 23 ride on the insides of the lower flanges of I-beams 24, 24 which form side frame members for the elevating frame 11.

The tension idler 19 and carriage 22 are moved in a direction to take up tension on the belt 10 which is held at the required tension by a winding drum 26 having a cable 27 wound thereon. The winding drum 26 is secured to a transverse shaft 28 which is journaled in opposite upright side frame members 29, 29 of the drive end frame 12, and is driven by a motor 30 through a speed reducer 31 and chain and sprocket drive 32. The motor 30 may be a series or other type of motor having good torque characteristics, and may be of any well known form, so is not shown or described in detail. The speed reducer 31 may also be of a well known form, and so is not shown in detail. A ratchet wheel 33 is secured to an outer end of the transverse shaft 28 and is adapted to be engaged by a pawl 34, to hold the winding drum 26 from rotating in an unwinding direction.

The cable 27 is trained from the winding drum 26 towards the inby end of the elevating frame 11, and around a sheave 35 mounted on a vertical shaft 36, which is mounted on a cross frame member 37 of said carriage. From said sheave the cable 27 is trained towards said winding drum and is provided with a hook 41 secured to its free end, and in turn to an eye 43, threaded on the end of a rod 44. The rod 44 extends through a control spring 45, mounted in an upright forward end of a bracket 46 projecting forwardly from a cross frame member 47 of the drive end frame 12.

The rod 44 has a sleeve 48 slidably mounted thereon, which is slidably mounted at its end adjacent the eye 43 in a seat 49 for the spring 45. The seat 49 engages and is mounted in a circular aperture formed in the upright forward end of the bracket 46. The opposite end of the sleeve 48 is engaged by a washer 50 abutted by a nut 51 threaded on said rod. A seat 53 for the spring 45 is slidably mounted on sleeve 48 and is interposed between the washer 50 and the end of the spring 45 opposite from the seat 49. A flange 54 is formed integrally with the sleeve 48 adjacent the end thereof adjacent the seat 49, and is adapted to engage an inside portion of the seat 49, to limit extensible movement of the spring 45. The spring is preloaded by taking up on the nut 51 in an obvious manner.

The spring 45 provides a means of controlling the operation of the motor 30, in such a fashion that when the spring lengthens because of lessened tension in the belt 10, the motor is caused to take up the cable 27, and so that when the spring is contracted by the proper tensioning of the belt the motor will stop.

The motor 30 is stopped by means of a limit switch 55 operated by movement of the rod 44, as the spring 45 is compressed or extended. The switch 55 may be of any well known form of quick make and break switch, and is shown as having an operating key or handle 56 which is engaged by a vertically extending groove 57, formed in an enlarged head 59 on the end of the rod 44 opposite from the eye 43. When the spring 45 is extended the handle 56 will be in the position shown in Figure 2 and the limit switch 55 will be in an on position to supply current to operate the motor 30. When the tension on the belt reaches the proper value where the spring 45 is compressed, the rod 44 will move with the spring 45 and turn the handle 56 and the switch 55 to an off position, and stop the motor 30.

Figure 1:
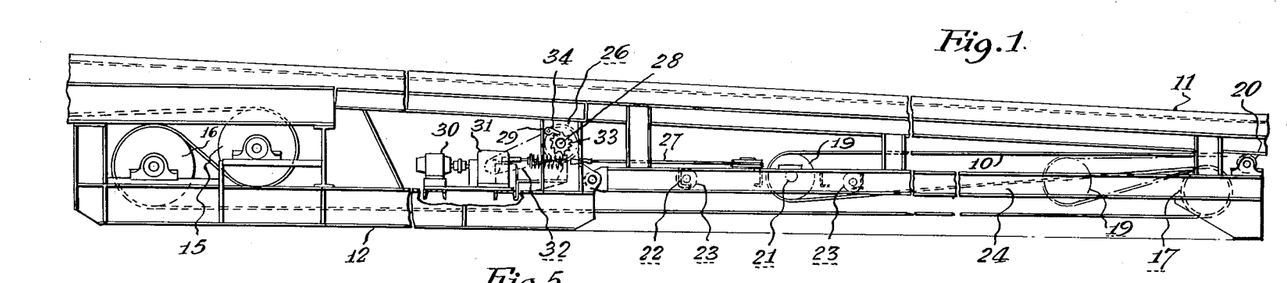
Figure 1 is a view in side elevation of the drive end of a sectional belt conveyor having a take-up means constructed in accordance with one embodiment of the invention.

It should here be understood that when initially setting up the conveyor, tension on the lower run of the belt is taken up by the motor 30 and cable 27 and that during this operation the tension idler 19 may be moved from the position shown by broken lines in Figure 1 to the position shown by solid lines in said figure. When the tension idler 19 is in the position shown by solid lines in Figure 1, the winding drum 26 will be held from unwinding by the pawl 34 and ratchet 33, and the tension idler 19 will be held in the desired position to maintain the required tension on the lower run of the belt. When the tension on the lower run of the belt is reduced as in cases where the load on the upper run thereof is changed, or where the belt might be started from a stopped condition, the spring 45 will extend. This will turn the limit switch to an on position and again start the motor 30 to again take up tension on the belt until a point is reached where the spring 45 is again compressed and the motor stopped.

It will be understood that when the correct tension is established on the lower run of the belt by the winding drum 26, that it is not necessary to pay off cable from the winding drum 26 to relieve tension from said belt, this being taken care of by the spring 45 and limit switch 55, and that the spring 45 is compressed or permitted to extend by the variation in tension or stretch of the belt. When, however, the conveyor is taken down and set in a new location, the cable 27 may be payed off said winding drum 26 by releasing the pawl 34 from the ratchet 33.

Figures 7, 9, 14:
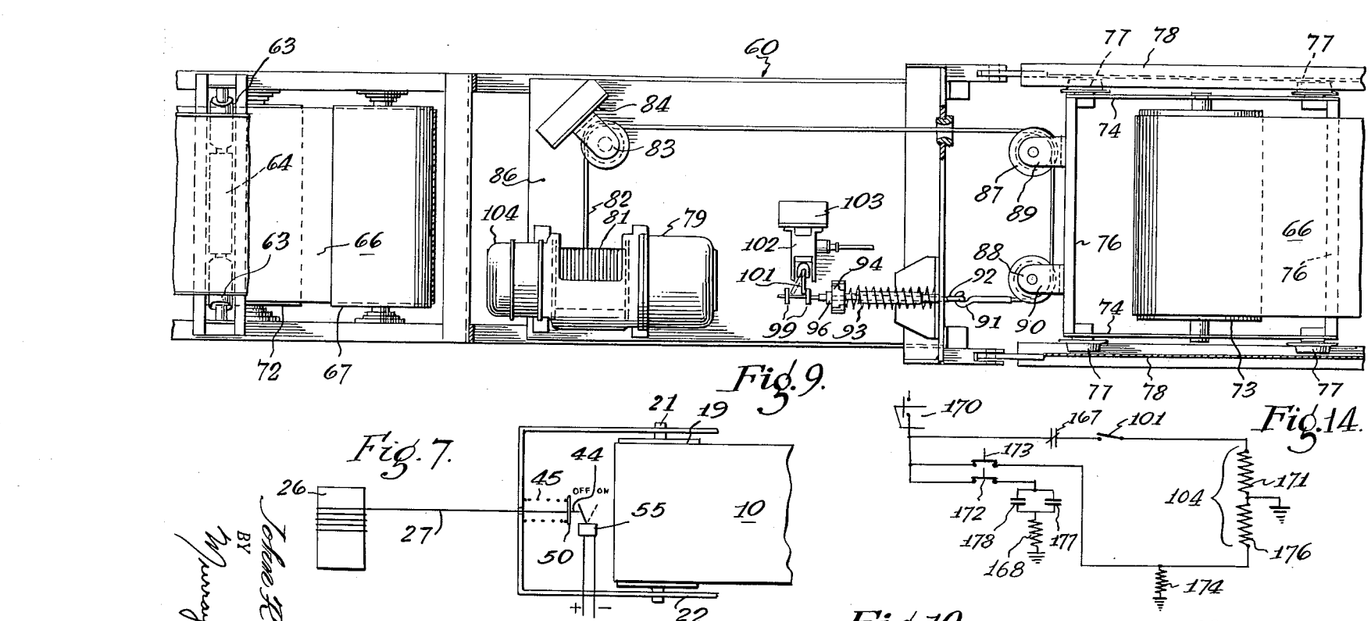
Figure 7 is a schematic view showing another manner in which the take-up cable is connected to the tension idler carriage.
Figure 9 is an enlarged plan view of a portion of the belt conveyor shown in Figure 8.
Figure 14 is a schematic diagram showing the electric circuit for the control of the take-up and release device according to this second embodiment of the invention.

Referring now to Figure 7 of the drawings, there is shown a form of the invention where the spring 45 is positioned on the carriage 22, as is also the limit switch 55. In this form the tension in the cable 27 is twice the tension in the lower run of the belt 10, rather than equal to the tension of the lower run of the belt, as is the case in the form of the invention shown in Figures 1 to 6. The functioning of the spring 45 and the limit switch 55 is identical, however, and when the spring 45 elongates, because of the lowered tension in the belt, it will move the switch to the "on" position to start the motor to take up the cable 27 on the winding drum 26 until the belt 10 is once more properly tensioned.

Figures 8, 11, 12, 13:
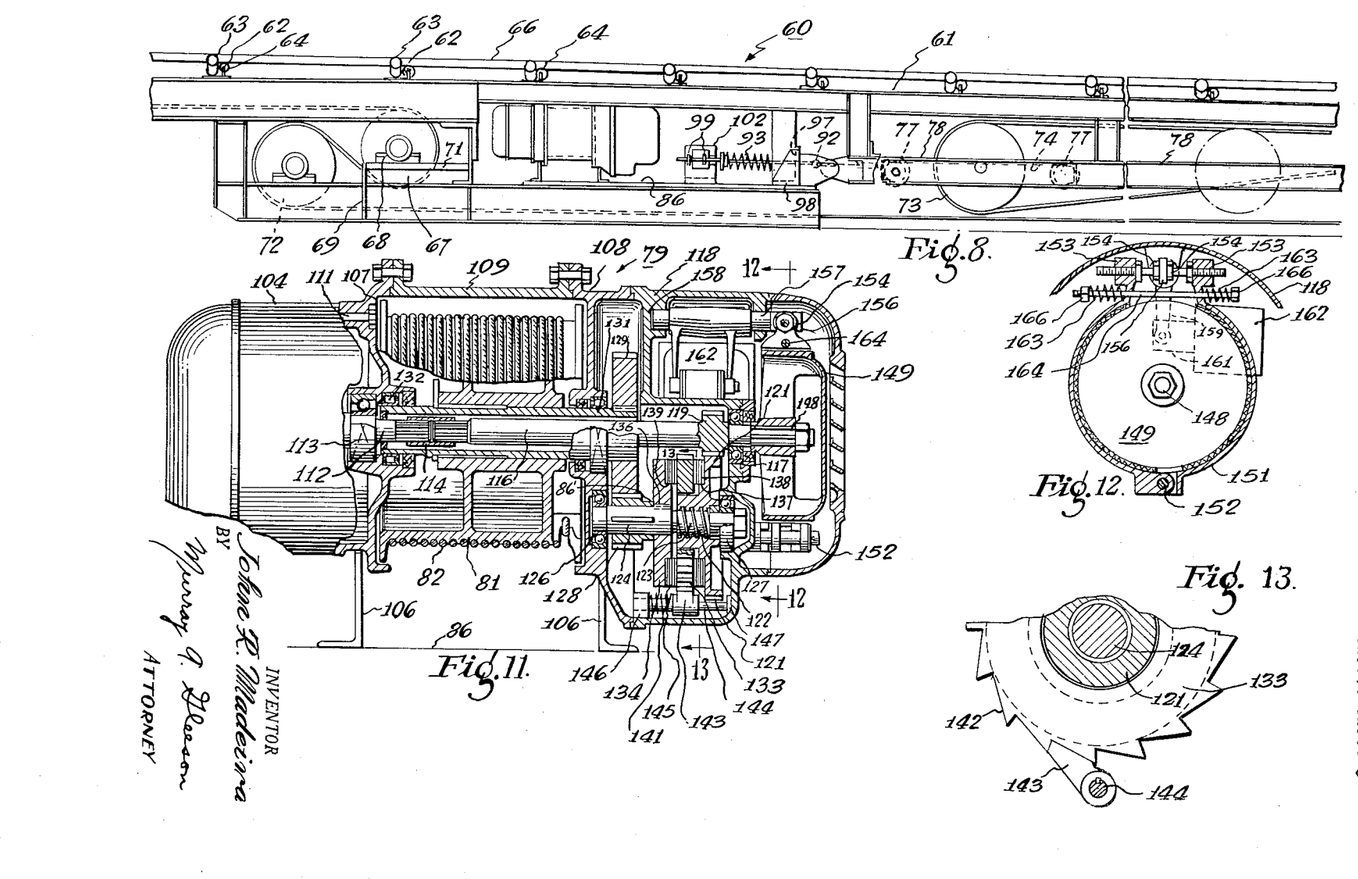
Figure 8 is a side view of a belt conveyor embodying the take-up and release device according to another embodiment of the present invention.
Figure 11 is a longitudinal sectional view of a take-up and release hoist mechanism shown in Figures 8 and 9.
Figure 12 is a transverse section taken along the line 12—12 of Figure 11, looking in the direction of the arrows.
Figure 13 is a fragmentary side elevation view taken along the line 13—13 of Figure 11, looking in the direction of the arrows.

Referring particularly to Figures 8 and 9 of the drawings, there is shown another form of the invention which is embodied in a belt conveyor indicated generally as 60. Such a conveyor consists in part of detachably connected side channel members 61 supported by a plurality of transverse vertical supporting standards, not shown, for the support of the conveyor on a mine floor. The spaced channel members 61 are arranged to support standards 62 for inclined idling guide rollers 63 and horizontal idlers 64, in a manner somewhat similar to that shown and described in the aforesaid Madeira Patent No. 2,373,839. The inclined idling rollers 63 and the horizontal rollers 64 are arranged to guide and support a belt 66 which is driven by a driving pulley 67 journaled in a support 68, which in turn is mounted on standards 69 and a platform 71.

The belt 66 is trained around an idler roller 72, also conveniently supported and journaled in the framework. The lower run of the belt 66 is then trained around an idler pulley, not shown, adjacent or towards the inby end of the belt, and extends in a reverse direction around a belt tensioning idler pulley 73 when it is then trained around an idler pulley, not shown, at the inby end of the belt conveyor unit 60.

The idler pulley 73 is journaled in spaced side members 74 which are connected adjacent their ends by channel members 76. The spaced side members 74 and the channel members 76 together form a carriage mounted upon flanged wheels 77, the rims of which are adapted to ride between the flanges of a channel 78, forming a part of the support structure for the conveyor belt 60.

Figure 10:
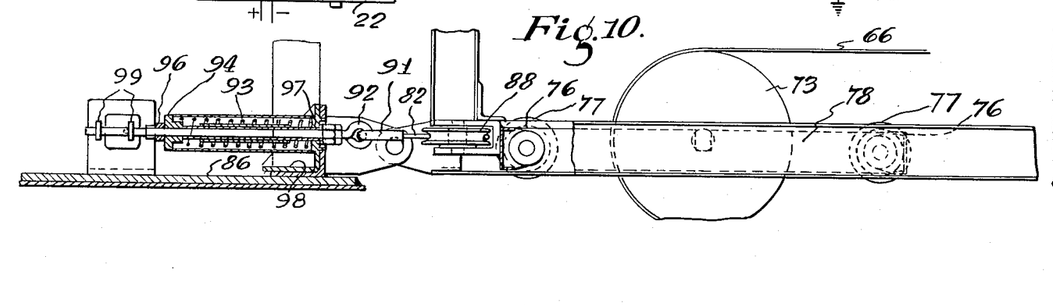
Figure 10 is an enlarged side view of a control spring and limit switch shown in Figures 8 and 9, for controlling the take-up and release device according to this embodiment of the invention.

Means are provided for moving the carriage thus described in a direction to place tension on the belt 66, as may be determined by a control or limit device, presently to be described, or to release tension on the belt 66 when it is desired to add a new section to the conveyor 60 and to splice a new section in the belt 66. To this end there is provided a winch 79 having a winch drum 81 with a cable 82 wound thereon which is trained around a guide sheave 83 held by a bracket 84 to a support frame 86, which also supports the winch 79. The cable 82 is additionally trained around a pair of sheaves 87 and 88 which are secured respectively by mounting brackets 89 and 90 to one of the channel members 76. The other end of the cable 82 is provided with a hook 91 which in turn is connected to an eyebolt 92. The eyebolt 92 is encircled by a spring 93, the load of which is initially adjusted by a collar 94 and a stop nut 96, the other end of the spring 93 abutting a stop 97 formed on an angle 98 welded to the support structure 86. The spring 93 is loaded to a value which is a function of the tension on the cable 82. The eyebolt 92 is also provided with a pair of lugs 99 which actuate a switch arm 101 of a limit switch 102, mounted on a bracket 103. Thus when the tension in the belt 66 decreases, the spring 93 will elongate and move the lugs on the eyebolt 92 to actuate the limit switch 101 to control the power to a motor 104 for operating the hoist drum 81, as will now be described.

Referring now particularly to Figures 11, 12 and 13 of the drawings, the winch 79 is mounted on a pair of supporting angles 106 which rest on the support 86. As shown with particular reference to Figure 11, the support angles 106 support end closures 107 and 108 of a housing 109 for the winch drum 81. The motor 104 is adapted to be secured to the end closure 107 by means of mounting bolts 111, and is provided with a shaft 112 journaled in a bearing 113 formed in the end closure 107. The shaft 112 has a splined connection 114 with a shaft 116 which is journaled in a bearing 117 formed in a hoist brake housing 118 fastened to the end closure 108 in any convenient manner. The shaft 116 has fast thereto a pinion 119 which mates with a gear 121 having an internally square-threaded hub 122 which cooperates with an external square-thread worm 123 formed on a shaft 124 journaled at one end at 126 in the end closure 108 and journaled at the other end in a bearing 127 held in the brake housing 118. The shaft 124 is keyed to a pinion 128 which drives a hoist gear 129 splined to a hollow shaft 131 which surrounds the drive shaft 116, and which is journaled in a bearing 132 formed in the end closure 107.

Means are provided to afford a releasable braking and driving connection between the motor 104 and the winch 81 according to the direction of rotation of the motor 104, and according to whether the drum 81 is paying off or taking up the cable 82. To this end the hub 122 of the gear 121 has freely mounted thereon an idler brake disk 133, see also Figure 13, which lies between the gear 121 and a floating disk brake shoe 134 which is splined as at 136 to the shaft 124. The gear 121 is provided with a step 137 to form a support for an annular friction disk 138. The brake shoe 134 is likewise provided with a step 139 to afford a support for a similar annular friction disk 141.

The periphery of the idler disk 133 is provided with ratchet teeth 142 which cooperate with a pawl 143 keyed to a pawl shaft 144 supported at each end on supports 146 and 147. The pawl shaft is urged in a clockwise direction, as seen in Figure 13, by means of a spring 145 which encircles the pawl shaft 144 and which is bottomed at one end upon the support 146, the other end being bottomed on the pawl 143.

Means are provided for braking the winch drum 81 when the motor 104 is deenergized, and also for braking the winch drum 81 when the motor 104 is energized to rotate in the opposite direction to pay off cable from the drum 81. When the motor 104 is deenergized and a pull is maintained upon the cable 81 tending to unwrap the cable, the pull will be transmitted in the pay-off direction through the hoist gear 129 and the pinion 128. Since the pinion 128 is fast on the pinion shaft 124 which is provided with the square thread 123, such tendency of the cable 66 to be payed off the hoist drum 81 will cause the pinion shaft 124 to thread into the hub 122 of the gear 121, and thus tend to move the braking surfaces 139 and 138 into firm engagement with the idler brake disk 133. Normally, this clamping action of the friction disks 138 and 141 against the brake disk 133 would cause it to move in a counterclockwise direction, as seen in Figure 13, excepting that such movement is restrained by the action of the pawl 143 cooperating with the ratchet teeth 142 on the idler disk.

When the motor 104 is energized in a direction to take up cable, the gear 121 will tend to rotate about the shaft 124 to release the braking contact effected between the braking surfaces 138 and 139 and the brake disk 142, the amount of such movement of the gear 121 with respect to the shaft 104 being limited by the thrust bearing 127. When the gear 121 has moved to the extreme right position in the windup operation, a driving connection is afforded by the matching square threads formed on the shaft 122 to cause the pinion 128 to drive the winch gear 129 in a direction to take up the cable 66.

Means are also provided to afford positive mechanical braking of the winch motor 104 when the same is deenergized. The shaft 116 is provided with a stub 148 which has fast thereto a braking drum 149, see also Figure 12, which is formed to provide a fan for the movement of cooling air past the motor 104, the interior of the hoist drum 81, and the braking drum 149. Referring now to Figure 12, the brake drum 149 is encircled by a split brake band 151 which is pivotally supported on a stud 152 secured to the interior of the winch brake housing 118. Each end of the brake band 151 is provided with an ear 153, each retaining a cam member indicated at 154. The brake band 151 is adapted to be spread apart by means of a cam 156 on the end of a rocker shaft 157 adapted to turn in a bracket 158 formed on the interior of the winch brake housing 118. The shaft 157 has a depending arm 159 which is fast thereto, and which is pivotally connected to a plunger 161 of a solenoid 162 supported within the brake housing 118 in any convenient manner. The brake bands 151 are urged in a direction to clamp against the drum 149 by means of springs 163 which encircle a brake rod 164 and which are adjusted by nuts 166.

The solenoid 162 is energized when the hoist motor 104 is energized and it will be seen that when the solenoid 162 is energized, the arm 159 will be rocked in a counterclockwise direction, as seen in Figure 12, to release the engagement of the brake bands 151 with the brake drum 149. Likewise, when the solenoid 162 is deenergized the springs 163 will force the bands 151 together against the brake drum 149, thus affording a positive brake when the winch motor 104 is deenergized.

Referring now to Figure 14 of the drawings, the hoist motor 104 is under the control of the limit switch 101 which is connected in series with a normally closed contact 167 of a lock-in relay 168 which is connected in series with a forward or take-up switch 172, and which is closed irrespective of the condition of the limit switch 101. When the limit switch 101 is closed, indicating that the belt 66 needs to be taken up, current is supplied to a winding 171 of a winch direction control which controls the direction of rotation of the winch motor 104 to take up the cable 82 and increase the tension of the belt 66. When the cable 82 has been taken up a sufficient distance, the limit switch 101 is opened to deenergize the winding 171 and stop the winch.

When it is desired to reverse the direction of the winch motor 104 controllably to release the tension on the belt 66, a reverse switch 173 is closed. The reverse switch 173 is connected in series-parallel with a relay winding 174 and a winding 176 of a winch direction control which controls the direction of the winch motor 104 to release the cable 82 and controllably release the tension on the belt 66.

The energization of the relay 174 closes a contact 177 associated therewith to energize the relay winding 168. The relay winding 168 is locked in by a holding contact 178. When the relay winding 168 is energized the contact 167 is opened, thus effecting decontrol of the limit switch 101.

When the cable 82 and the belt 66 have been released a desired amount, an on-off switch 170 may be operated to open the power supply to the windings 171 and 176 and thereby release the arrangement from control by the limit switch 101.

It will be apparent that the winch motor 104 will operate in the reverse direction to pay off the cable 82 at a definite rate controlled by the alternate braking and releasing action of the winch brake described with reference to Figure 12. At any time the cable 82 tends to overrun the motor 104, the brake will operate until the motor 104 overtakes the cable 82, thus insuring that the cable 82 and the belt 66 will be released at a definite rate as determined by the speed of the motor 104.

From the foregoing description it will be apparent that there has been provided a novel and useful arrangement for automatically adjusting the belt tension of a belt conveyor. In the second form of the invention not only is automatic take-up of the belt provided but also release of the tension thereof at a controlled rate.

While I have herein shown and described two forms in which my invention may be embodied, it will be understood that the construction thereof and the arrangement of the various parts may be altered without departing from the spirit and scope thereof. Furthermore, I do not wish to be construed as limiting my invention to the specific embodiments illustrated, excepting as they may be limited in the appended claims.

I claim as my invention:

1. In a belt conveyor including a belt trained around a drive roller adjacent the discharge end of the conveyor, and means for maintaining a predetermined tension on the slack side of said belt both while the conveyor is operating and stationary including a tension idler having a bight of the belt trained therearound and mounted for movement with respect to said drive roller in directions to take up said belt or to relieve tension therefrom, a motor, a preloaded spring, a flexible member operatively connected with said spring and tension idler for moving said tension idler in a direction to maintain tension on the lower run of the belt, and for exerting a pull on said spring of a value which is a function of the tension of the lower run of the belt, means driven by said motor in one direction only for moving said flexible member in a direction to maintain tension on the lower run of said belt, means holding said member from relieving tension from the belt, an electrical control means for said motor including a limit switch operatively connected with and actuated upon deformation of said spring, to stop said motor upon deformation of said spring a predetermined amount when the tension of the lower run of the belt attains a predetermined value, and to start said motor to take up tension on said belt upon deformation of said spring in an opposite sense.

2. In a belt conveyor including a belt trained around a drive roller adjacent the discharge end of the conveyor, and means for maintaining a predetermined tension on the slack side of said belt both while the conveyor is operating and stationary including a tension idler having a bight of the belt trained therearound and mounted for movement with respect to said drive roller in directions to take up said belt or to relieve tension therefrom, a motor, a preloaded spring, a flexible member connected with said spring adjacent one of its ends and with said tension idler intermediate its ends for moving said tension idler to take up on and maintain tension on the lower run of the belt, and exerting a pull on said spring determined by tension of the lower run of the belt, a winding drum driven by said motor in one direction only for winding in said flexible member and maintaining tension thereon and on the lower run of the belt, means independent of said motor for holding said winding drum from rotating in an unwinding direction, a limit switch for controlling operation of said motor, and an operative connection between said flexible member and said limit switch controlled by extension and contraction of said spring for operating said switch to an off position to stop said motor, upon yielding of said spring effected by the pull thereon by said flexible member, and for operating said switch to an on position to start said motor upon release of tension on the lower run of said belt and extension of said spring.

3. In combination with a belt conveyor including a belt trained around a drive roller adjacent the discharge end of the conveyor, and means for maintaining a predetermined tension on the slack side of said belt both while the conveyor is operating and stationary including a tension idler having a bight of the belt trained therearound and mounted for movement with respect to said drive roller in directions to take up said belt or to relieve tension therefrom, a motor, a preloaded spring, a flexible member connected with said spring adjacent one of its ends and with said tension idler intermediate its ends for moving said tension idler to take up and maintain tension on the lower run of the belt and exerting a pull on said spring determined by the tension of the lower run of the belt, a winding drum driven by said motor in one direction only for winding in said flexible member and maintaining tension thereon and on the lower run of the belt, means operable to prevent rotation of said drum in a direction to relieve tension from the belt, a limit switch for controlling operation of said motor, and an operative connection between said flexible member and said limit switch for operating said switch to an off position to stop said motor, upon yielding of said spring when the tension of the lower run of the belt exceeds a predetermined value, and for operating said switch to an on position to start said motor upon release of tension on the lower run of said belt and the extension of said spring, and including a rod extending through said spring and connected with said flexible member at one of its ends and with said spring intermediate its ends, to tend to compress said spring upon pull on said cable, and having operative connection with said limit switch adjacent its end opposite its point of connection to said cable.

4. In a tensioning device for a sectional belt conveyor, a conveyor belt, a conveyor framework having a carriage movable therealong between the upper and lower runs of the belt, a plurality of drive rollers mounted in said framework, a tension idler mounted on said carriage and engaging a bight of said belt to take up on the lower run thereof and to maintain tension thereon upon movement of said carriage along said framework in one direction, and means for moving said carriage along said framework in a direction to maintain tension on the lower run of the belt including a winding drum, a motor for driving said winding drum, a flexible cable connected to said drum and adapted to be wound thereon, a sheave on said carriage and adapted to be engaged by a bight of said cable, a limit switch for controlling operation of said motor, a preloaded compression spring loaded to yield upon changes in tension of the lower run of said belt, means selectively operable to hold said drum from rotation in an unwinding direction, a connection between the free end of said cable and said spring acting in a direction to tend to compress said spring when said cable is moving said carriage in a direction to take up on the lower run of the belt, and an operative connection between said cable and said limit switch controlled by extension and contraction of said spring and operating said switch to an off position upon yielding of said spring when the tension on the lower run of said belt reaches a predetermined value, and for operating said switch to an on position to start said motor and take up tension on the belt upon extension of said spring effected by decrease in tension on said belt.

5. In a tensioning device for a sectional belt conveyor, a conveyor belt, a conveyor framework having a carriage movable therealong between the upper and lower runs of the belt, a plurality of drive rollers mounted in said framework, a tension idler mounted on said carriage and engaging a bight of said belt to take up on the lower run thereof and to maintain tension thereon upon movement of said carriage along said framework in one direction, and means for moving said carriage along said framework in a direction to maintain tension on the lower run of the belt including a winding drum, a motor for driving said winding drum, a flexible cable connected to said drum and adapted to be wound thereon, a sheave on said carriage and adapted to be engaged by a bight of said cable, a limit switch for controlling operation of said motor, a preloaded compression spring having a rod extending therethrough and adapted to compress said spring upon a predetermined pull thereon, an operative connection between said cable and said rod, to exert a force on said spring of a value which is a function of the tension of the lower run of said belt and an operative connection between said rod and said limit switch, for operating said switch and turning said switch to an off position upon yielding of said spring, when the tension on the lower run of said belt reaches a predetermined value, and for turning said switch to an on position to start said motor upon extension of said spring, effected by decrease in tension of said belt, and means independent of said motor positively holding said drum from rotating in an unwinding direction.

6. In a tensioning device for a sectional belt conveyor, a conveyor belt, a conveyor framework having a carriage movable therealong between the upper and lower runs of the belt, a plurality of drive rollers for said belt mounted in said framework, a tension idler mounted on said carriage and engaging a bight of said belt to take up on the lower run thereof and to maintain tension thereon, and means for moving said carriage along said framework in a direction to maintain tension on the lower run of the belt including a winding drum, a motor for driving said winding drum, a flexible cable connected to said drum and adapted to be wound thereon, a sheave on said carriage and adapted to be engaged by a bight of said cable, a limit switch for controlling operation of said motor, a preloaded compression spring having a rod extending therethrough and adapted to compress said spring upon a predetermined pull thereon determined by the tension of the lower run of said belt, an operative connection between the free end of said cable and said rod and an operative connection between said rod and said limit switch for operating said switch and turning said switch to an off position upon yielding of said spring, when the tension on the lower run of said belt reaches a predetermined value and for turning said switch to an on position to start said motor upon extension of said spring effected by decrease in tension on said belt, and ratchet means for holding said winding drum from moving in an unwinding direction and selectively operable to permit unwinding thereof.

7. In a belt conveyor having a driving roller for driving said belt and an idler roller adapted to move with respect to said driving roller to adjust the tension on said belt, a carriage for supporting said idler roller for movement in a direction to increase the tension on said belt, a motor driven winch including a flexible cable wound thereon and operatively connected to said carriage, a spring connected to the free end of said flexible cable, and a limit switch adapted to be closed upon elongation of said preloaded spring as a function of the decrease in tension on said belt to drive said motor driven winch in a direction to move said carriage and said idler roller to increase the tension on said belt, and load said spring to a value which is a function of the proper tension on said belt to open said switch and stop said motor driven winch.

8. In a belt conveyor having a driving roller for driving said belt and an idler roller adapted to move with respect to said driving roller to adjust the tension on said belt, a carriage for supporting said idler roller for movement in a direction to increase the tension on said belt, a motor driven winch including a flexible cable wound thereon and operatively connected to said carriage, a spring connected to the free end of said flexible cable, a limit switch adapted to be closed upon elongation of said spring as a function of the decrease in tension on said belt to drive said motor driven winch in a direction to move said carriage and said idler roller to increase the tension on said belt, and load said spring to a value which is a function of the proper tension on said belt to open said switch and stop said motor driven winch, and a ratchet associated with said motor driven winch for holding said flexible cable against unwinding and against movement of said carriage and said idler roller in a direction to release tension on said belt.

9. In a sectional conveyor, a frame, an endless belt supported to move along said frame, a drive roller journaled on said frame for driving said belt, an idler roller mounted on said frame for movement with respect to said drive roller to take up tension on said belt, a carriage supported on said frame for movement longitudinally thereof and having said idler roller journaled thereon, a winding drum journaled on said frame, a motor on said frame, a drive from said motor to said winding drum, means selectively operable to positively hold said winding drum from rotation in an unwinding direction to prevent the release of tension from said belt, a flexible member connecting said winding drum to said carriage for moving said carriage to take up tension on the belt and maintain tension thereon, a spring mounted on said frame and loaded in accordance with the required tension on the belt, a rod having abutting engagement with an end of said spring and having the free end of said cable connected thereto, a limit switch on said frame, electrical connections from said limit switch to said motor to stop and start said motor, and an engaging connection between said rod and switch controlled by the tension of said spring and operating said switch to stop said motor upon compression of said spring effected by the bringing of tension on said belt to the required predetermined value, and to start said motor upon the extension of said spring effected by the reduction in tension on said belt below the required predetermined value.

10. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, and a solenoid controlled brake connected in said circuit and adapted to be released when said motor is energized by said voltage source for movement of said carriage and said idler roller in a direction to relieve or take up tension on said belt and adapted to be engaged when said motor is deenergized.

11. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, a solenoid controlled brake connected in said circuit and adapted to be released when said motor is energized from said voltage source for movement of said carriage and said idler roller in a direction to relieve or take up tension on said belt and adapted to be engaged when said motor is deenergized, and a manually operated control switch connected in said circuit for reversing the direction of said motor in controllably releasing tension on said belt.

12. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt: the combination therewith of a circuit connecting said motor to a voltage source including a limit switch therein for controlling the direction of rotation of said motor in taking up tension on said belt, means responsive to the tension in said belt for operating said limit switch, a solenoid controlled brake connected in said circuit and adapted to be released when said motor is energized for movement of said carriage and said idler roller in a direction to relieve or take up tension on said belt and adapted to be engaged when said motor is deenergized, and a brake operable in response to the tension in said belt for controlling the release of tension of said belt upon reversal of said motor.

13. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt: the combination therewith of a circuit connecting said motor to a voltage source including a limit switch therein for controlling the direction of rotation of said motor in taking up tension on said belt, means responsive to the tension in said belt for operating said limit switch, a solenoid controlled brake connected in said circuit and adapted to be released when said motor is energized for movement of said carriage and said idler roller in a direction to relieve or take up tension on said belt and adapted to be engaged when said motor is deenergized, a manually operated control switch connected in said circuit for reversing the direction of said motor in controllably releasing tension on said belt, and a brake associated with said motor and said winch and operable in response to the tension in said belt for controlling the release of tension of said belt upon reversal of said motor.

14. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, a solenoid controlled brake connected in said circuit and adapted to be released when said motor is energized for movement of said carriage and said idler roller in a direction to relieve or take up tension on said belt and adapted to be engaged when said motor is deenergized, and a brake associated with said motor and said winch and operable in response to the tension in said belt for controlling the release of tension of said belt upon reversal of said motor, said brake comprising a pair of braking surfaces adapted to move into braking engagement when the speed of said winch in release of tension tends to overrun said motor when operating in the reverse direction to release tension on said belt.

15. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, a solenoid controlled brake connected in said circuit and adapted to be released when said motor is energized for movement of said carriage and said idler roller in directions to relieve and take up tension on said belt and adapted to be engaged when said motor is deenergized, a manually operated control switch connected in said circuit for reversing the direction of said motor in controllably releasing tension on said belt, a brake associated with said motor and said winch and operable in response to the tension in said belt for controlling the release of tension of said belt upon reversal of said motor, said brake comprising a pair of braking surfaces adapted to move into braking engagement when the speed on said winch in release of tension of said belt tends to overrun said motor when operating in the reverse direction to release tension on said belt.

16. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, and a manually operated control switch connected in said circuit for reversing the direction of said motor in controllably releasing tension on said belt.

17. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, and a brake associated with said motor and said winch and operable in response to the tension in said belt for controlling the release of tension of said belt upon reversal of said motor.

18. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, a manually operated control switch connected in said circuit for reversing the direction of said motor in controllably releasing tension on said belt, and a brake associated with said motor and said winch and operable in response to the tension in said belt for controlling the release of tension of said belt upon reversal of said motor.

19. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a circuit connecting said motor to a voltage source including a limit switch therein for controlling the direction of rotation of said motor in taking up tension on said belt, means responsive to the tension in said belt for operating said limit switch, a manually operated control switch connected in said circuit for reversing the direction of said motor in controllably releasing tension on said belt, and a brake associated with said motor and said hoist and operable in response to the tension in said belt for controlling the release of tension of said belt upon reversal of said motor, said brake comprising a pair of braking surfaces adapted to move into braking engagement when the speed of said winch in release of tension tends to overrun said motor when operating in a reverse direction to release tension on said belt and to move out of such braking engagement when said motor has overrun said winch.

20. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a limit switch for controlling the direction of rotation of said motor in taking up tension on said belt, means responsive to the tension in said belt for operating said limit switch, and circuit means including a switch operable to effect rotation of said motor in a reverse direction including means for causing said limit switch to be ineffective irrespective of the condition thereof during such reverse rotation of said motor.

21. In a belt conveyor having a driving roller for driving said belt and a movable tension idler roller for varying the amount of tension on said belt, a carriage for supporting said tension idler roller for movement to release and take up tension on said belt, a motor including a winch operatively connected to said carriage for moving said carriage in a direction to take up tension on said belt and for controllably releasing said carriage for movement of said tension idler roller in a direction to release tension on said belt, a limit switch for controlling the direction of rotation of said motor in taking up tension on said belt, means responsive to the tension in said belt for operating said limit switch, and a manually operated control switch for reversing the direction of said motor in controllably releasing tension on said belt, said manually operated control switch being in circuit with means for causing said limit switch to be ineffective irrespective of the condition thereof during such reverse rotation of said motor.

References Cited in the file of this patent

UNITED STATES PATENTS

| Number | Name | Date |
|---|---|---|
| 1,890,679 | Hallenbeck | Dec. 13, 1932 |
| 2,244,033 | Trempe | June 3, 1941 |
| 2,244,221 | Schroeder | June 3, 1941 |
| 2,306,448 | Kratz | Dec. 29, 1942 |
| 2,436,657 | McCulloch | Feb. 24, 1948 |
| 2,463,273 | Holstein | Mar. 1, 1949 |